United States Patent
Harmon (10) Patent No.: US 11,358,625 B2
(45) Date of Patent: Jun. 14, 2022

(54) DISAPPEARING STEERING WHEEL AND PEDALS

(71) Applicant: Ford Global Technologies, LLC, Dearborn, MI (US)

(72) Inventor: Michael John Harmon, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/087,342

(22) Filed: Nov. 2, 2020

(65) Prior Publication Data

US 2022/0135112 A1     May 5, 2022

(51) Int. Cl.
| | |
|---|---|
| *B62D 1/183* | (2006.01) |
| *B60T 7/06* | (2006.01) |
| *B60R 11/02* | (2006.01) |
| *B60K 35/00* | (2006.01) |
| *B62D 1/181* | (2006.01) |
| *G05D 1/00* | (2006.01) |

(Continued)

(52) U.S. Cl.
CPC .............. *B62D 1/183* (2013.01); *B60K 26/02* (2013.01); *B60K 35/00* (2013.01); *B60R 11/0229* (2013.01); *B60T 7/06* (2013.01); *B62D 1/04* (2013.01); *B62D 1/181* (2013.01); *G05D 1/0061* (2013.01); *B60K 2026/026* (2013.01); *B60K 2370/167* (2019.05); *B60K 2370/67* (2019.05); *B60R 2011/0003* (2013.01); *B60R 2011/0085* (2013.01)

(58) Field of Classification Search
CPC .......... B62D 1/183; B62D 1/04; B60K 26/02; B60K 2026/026; B60K 35/00; B60K 2370/67; B60K 2370/685; B60K 2370/682; B60R 11/0235; B60R 2011/0003; B60R 2011/0085; B60T 7/06; G05D 1/0061

See application file for complete search history.

(56) References Cited

U.S. PATENT DOCUMENTS

| | | | |
|---|---|---|---|
| 5,246,084 A | * | 9/1993 | Ferraiuolo ................ B60T 7/06 180/323 |
| 9,333,983 B2 | | 5/2016 | Lathrop et al. |

(Continued)

FOREIGN PATENT DOCUMENTS

| | | |
|---|---|---|
| DE | 10245523 A1 | 4/2004 |
| DE | 10347925 A1 | 5/2005 |

(Continued)

OTHER PUBLICATIONS

Name Not Available, Vehicular Display Apparatus, Oct. 14, 2015, EPO, DE 202015103992 U1, Machine Translation of Description (Year: 2015).*

*Primary Examiner* — James A English
*Assistant Examiner* — Matthew D Lee
(74) *Attorney, Agent, or Firm* — Vichit Chea; Price Heneveld LLP (57) ABSTRACT

A motor vehicle includes a steering wheel and/or pedals that can be moved from an active driving position to an inactive or stowed position. The motor vehicle may include a pedal shield that substantially blocks a driver's access to the pedals when the pedals are in an inactive position. The steering wheel and pedals may shift laterally simultaneously between the active and inactive positions or configurations.

18 Claims, 8 Drawing Sheets

(51) Int. Cl.
  *B60K 26/02* (2006.01)
  *B62D 1/04* (2006.01)
  *B60R 11/00* (2006.01)

(56) References Cited

U.S. PATENT DOCUMENTS

| | | | |
|---|---|---|---|
| 10,494,010 | B2 | 12/2019 | von Freyberg et al. |
| 10,562,558 | B1 | 2/2020 | Spahn et al. |
| 10,946,740 | B2 * | 3/2021 | Sweet .................... B60K 37/06 |
| 2004/0016588 | A1 * | 1/2004 | Vitale ..................... B62D 1/04 |
| | | | 180/322 |
| 2019/0367072 | A1 | 12/2019 | Hansen et al. |
| 2021/0316776 | A1 * | 10/2021 | Ko .......................... B62D 1/06 |

FOREIGN PATENT DOCUMENTS

| | | | | |
|---|---|---|---|---|
| DE | 202015103992 | U1 * | 10/2015 | ............. B60K 35/00 |
| DE | 102016210622 | A1 * | 12/2017 | ................ B60T 7/06 |
| DE | 102018203930 | A1 * | 9/2019 | ............. B62D 5/001 |
| GB | 2308642 | B | 9/1998 | |
| GB | 2550640 | A | 11/2017 | |
| GB | 2550641 | A * | 11/2017 | ............... B62D 1/18 |
| GB | 2550641 | A | 11/2017 | |
| JP | 3468742 | B2 | 11/2003 | |
| WO | 2003020571 | A1 | 3/2003 | |
| WO | 2017067721 | A1 | 4/2017 | |
| WO | WO-2019016579 | A1 * | 1/2019 | ............... B62D 1/00 |
| WO | 2020095020 | A1 | 5/2020 | |
| WO | WO-2020095020 | A1 * | 5/2020 | ............ B62D 1/183 |

\* cited by examiner

DISAPPEARING STEERING WHEEL AND PEDALS

FIELD OF THE DISCLOSURE

The present disclosure relates to motor vehicles, and, in particular, to a motor vehicle having a steering wheel and/or pedals that can be shifted laterally to stowed or non-use positions.

BACKGROUND OF THE DISCLOSURE

Motor vehicles typically include a steering wheel that is configured to be grasped by a user to provide steering control of the vehicle in use. Motor vehicles may also include one or more foot pedals that can be operated by a user to control the speed of the vehicle.

SUMMARY OF THE DISCLOSURE

One aspect of the present disclosure is a motor vehicle including a passenger compartment that includes a driver's seating area, a front passenger seating area, and a center area between the driver's seating area and the front passenger seating area. The motor vehicle includes a movable support structure and a steering wheel that is movably (e.g., rotatably) connected to the movable support structure. The vehicle further includes one or more foot pedals that are movably connected to the movable support structure. A powered actuator is operably connected to the movable support structure. Actuation of the powered actuator moves the movable support structure, thereby moving the steering wheel and the foot pedals between an active driving position in which the steering wheel and the foot pedals are aligned in a fore-aft direction with the driver's seating area, and an inactive position in which the steering wheel and the pedals are aligned in a fore-aft direction with the center area of the passenger compartment and an inactive position in which the steering wheel and pedals are both shifted laterally relative to the active position.

Embodiments of the first aspect of the present disclosure can include any one or a combination of the following features:

The motor vehicle may include a control system having an autonomous mode and a driver-controlled mode, whereby a vehicle operator does not need to access the steering wheel or the pedals to control the motor vehicle when the control system is in the autonomous mode.

The passenger compartment may optionally include a lower space having driver and passenger footwells in front of the driver and passenger seating areas, respectively. The lower space may further include a lower center space between the driver and passenger footwells. The pedals may be positioned in the driver footwell when the pedals are in the active driving position, and the pedals may be positioned in the lower center space when the pedals are in the inactive position.

The motor vehicle may include a pedal shield disposed in the lower space. The pedals may be positioned forward of the pedal shield when the pedals are in the inactive position to prevent inadvertent actuation of the pedals.

The motor vehicle may include a horizontally extending dashboard structure having a driver's side portion in front of the driver's seating area and a center portion that is forward of the center area. The motor vehicle may further include an electronic display screen disposed adjacent the center portion of the horizontally extending dashboard structure. The steering wheel may be positionable in a gap between the electronic display screen and the center portion of the horizontally extending dashboard structure when the steering wheel is in the inactive position.

The electronic display screen may have an oblong shape (e.g., rectangular) defining a first dimension along a length of the oblong shape that is greater than a second dimension that is transverse to the length. The electronic display screen may be pivotable between a portrait orientation in which the first dimension is disposed in a substantially vertical plane, and a landscape orientation in which the first dimension is disposed in a substantially horizontal plane.

The powered actuator may be configured to simultaneously shift the steering wheel and the pedals from the active driving position to the inactive position upon actuation of the powered actuator.

The powered actuator may be configured to simultaneously shift the steering wheel and the pedals from the inactive position to the active driving position upon actuation of the powered actuator.

The motor vehicle may include a horizontally-extending guide structure, and the movable support structure may be operably connected to the horizontally-extending guide structure for guided lateral movement between the active driving position and the inactive position.

The motor vehicle may optionally include a pivot arm movably connecting the movable support structure to a vehicle structure, such that actuation of the powered actuator causes the pivot arm to pivot thereby moving the movable support structure between the active driving position and the inactive position.

The steering wheel may be supported by a steering column having an opening in an upper surface thereof. The motor vehicle may include a cluster display movably mounted to the steering column for movement between a use position in which the cluster display projects upwardly from the elongated opening whereby images on a first portion of the cluster display are visible to an operator in the driver's seating area, and a stowed position in which the cluster display is lowered into the opening such that the first portion of the cluster display is not visible to an operator in the driver's seating area.

The steering wheel may optionally include an outer portion having at least two gripping portions that are configured to be simultaneously grasped by an operator of the motor vehicle, and a steering pivot arm pivotably connected to the outer portion of the steering wheel and to the steering column, whereby the outer portion of the steering wheel can be moved relative to the steering column between a use position and a stowed position, wherein the stowed position is forward of the use position.

Another aspect of the present disclosure is a motor vehicle including a passenger compartment having a driver's seating area, a driver's footwell in front of the driver's seating area, and a central space adjacent the driver's footwell. The motor vehicle includes a pedal shield disposed in the central space, and a foot pedal that is laterally movable between a use position in the driver's footwell, and an inactive position in which the pedal shield substantially blocks access to the foot pedal by an operator seated in the driver's seating area.

Embodiments of the second aspect of the present disclosure can include any one or a combination of the following features:

The motor vehicle may include a powered actuator that is configured to shift the foot pedal laterally between the use position and the inactive position.

The motor vehicle may include a dashboard, and the pedal shield may be positioned below a central portion of the dashboard. The pedal shield may include an angled surface facing rearwardly and upwardly.

The motor vehicle may include a steering wheel that is supported by a laterally-movable support structure. The foot pedal may be supported by the laterally-movable support structure. Actuation of the powered actuator may move the laterally-movable support structure to thereby laterally move the steering wheel and the foot pedal.

The motor vehicle may optionally include a dashboard having an end that is spaced-apart from an inner surface of a driver's side door to define a gap. The motor vehicle may further include a steering wheel that is movably mounted to a vehicle structure, whereby the steering wheel moves laterally from a use position in front of the driver's seating area towards a stowed position adjacent the driver's side door, and pivots about an upright axis and moves into the gap when in the stowed position.

Another aspect of the present disclosure is a motor vehicle including a passenger compartment having a driver's seating area and a foot pedal that is positionable in a driver's footwell in front of the driver's seating area. The motor vehicle also includes a dashboard having an end that is spaced-apart from an inner surface of a driver's side door to define a gap. The motor vehicle further includes a steering wheel that is movably mounted to a vehicle structure, whereby the steering wheel moves laterally from a use position in front of the driver's seating area towards a stowed position adjacent the driver's side door, and pivots about an upright axis and moves into a stowed position at least partially in the gap.

Embodiments of a third aspect of the present disclosure can include any one or a combination of the following features:

The steering wheel may include a rim and a connecting structure that extends from the rim when the steering wheel is in the use position. The end of the dashboard may include a slot, and at least a portion of the connecting structure of the steering wheel may be disposed in the slot when the steering wheel is in the stowed position.

The foot pedal may be connected to a link that pivots about an upright axis, such that the foot pedal moves between a use position in the driver's footwell to a stowed position outside of the driver's footwell upon pivoting of the link.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein the term "or" is not an exclusive or. For example, an item including A or B may include A alone, B alone, or both A and B.

As used herein, the term "and/or," when used in a list of two or more items, means that any one of the listed items can be employed by itself, or any combination of two or more of the listed items can be employed. For example, if a composition component, or assembly, is described as containing components A and/or B and/or C, the composition component, or assembly, can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein the terms "the," "a," and "an," mean "at least one," and should not be limited to "only one" unless explicitly indicated to the contrary. Thus, for example, reference to "a component" includes embodiments having only one such component and embodiments having two or more such components unless the context clearly indicates otherwise.

With reference to FIGS. 1-4, a motor vehicle 1 includes a passenger compartment 2 including a driver's seating area 3 including a driver's seat 4, and a front passenger seating area 5 including a passenger seat 6. The passenger compartment may further include a center area 7 between the driver's seating area 3 and the passenger seating area 5. The motor vehicle 1 further includes a movable support structure 10 and a steering wheel 12. The steering wheel 12 is rotatably interconnected to the support structure 10 for rotation "R" (FIG. 1) to control steering of the motor vehicle 1. Motor vehicle 1 may include a steering column 14 including a connecting structure 15 (FIG. 2) that connects the steering wheel 12 to the movable support structure 10. It will be understood that FIGS. 1-4 are partially schematic in nature, and the configuration of the steering column 14, connecting structure 15, and movable support structure 10 may vary as required for a particular application. Steering wheel 12 may include one or more sensors 16 (FIG. 2) that detect an angular position of steering wheel 12 to provide inputs to a controller 17 to provide a "steer-by-wire" arrangement. Alternatively, the steering column 14 may comprise a conventional steering column providing mechanical steering of the front wheels (not shown) of motor vehicle 1. As discussed in more detail below, controller 17 may comprise one or more individual controllers, circuits, software, and other suitable components to control various vehicle functions. In particular, controller 17 may be configured to provide a driver control mode in which a vehicle driver controls motor vehicle 1, and an autonomous mode in which controller 17 controls the speed and steering of motor vehicle 1.

Motor vehicle 1 further includes one or more foot pedals, such as an accelerator pedal 18A and a brake pedal 18B, that are movably connected to the movable support structure 10 for pivoting movement about a generally horizontal axis A1 (FIG. 2) as shown by the arrow "P." The pedals 18A and 18B may be operably connected to sensors 16A and 16B that are operably connected to controller 17 whereby controller 17 receives an input corresponding to position and/or movement of pedals 18A and 18B. Alternatively, pedals 18A and 18B may comprise conventional pedals that are mechanically interconnected to the vehicle brake and engine to provide control of motor vehicle 1. Motor vehicle 1 may have an engine comprising an internal combustion engine, electric motor, or a combination thereof.

Figure 4:
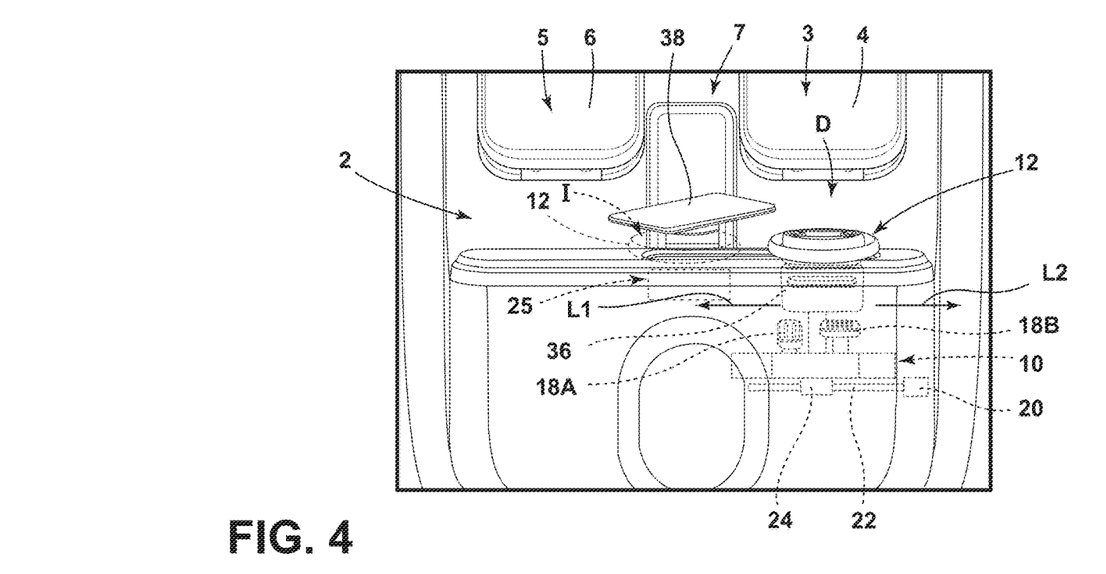
FIG. 4 is a partially fragmentary plan view of a portion of the motor vehicle of FIG. 1.

With reference to FIG. 4, motor vehicle 1 may further include a powered actuator, such as an electric motor 20 (e.g., an electric stepper motor), that is operably connected to the movable support structure 10. In the illustrated example, the electric motor 20 is operably connected to the movable support structure 10 by a ball screw 22 that may be selectively rotated by electric motor 20, and a ball nut 24 that is connected to the movable support structure 10. Thus, actuation (powered rotation) of electric motor 20 rotates ball screw 22 thereby shifting the movable support structure 10 laterally in the direction of the arrow "L1" and arrow "L2," depending on the direction of rotation of electric motor 20. It will be understood that the electric motor 20, ball screw 22, and ball nut 24 are merely one example of a powered actuator that may be utilized to shift the movable support structure 10 in a lateral direction. Virtually any suitable powered actuator may be utilized consistent with the present disclosure depending on the requirements of the particular application.

As discussed in more detail below, actuation of electric motor 20 moves the movable support structure 10, thereby simultaneously moving the steering wheel 12 and the pedals 18A and 18B laterally between a driving position "D" (FIG. 4) in which the steering wheel 12 and the pedals 18A and 18B are generally aligned in a fore-aft direction with the driver's seating area 3, and an inactive position "I" in which the steering wheel 12 and the pedals 18A and 18B are generally aligned in a fore-aft direction with the center area 7 of the passenger compartment 2.

Referring again to FIGS. 1 and 2, the motor vehicle 1 may further include a pedal shield 25 having a plate portion 26 having surface 27 that faces upwardly and rearwardly. Motor vehicle 1 may include a lower space 28 below a dashboard structure 30. Lower space 28 may include driver and passenger footwells 32A and 32B, and a lower center space 33 that is generally between the driver and passenger footwells 32A and 32B, respectively. The plate portion 26 of pedal shield 25 may be spaced-apart from lower firewall floor surface 35 to form a gap 36 between pedal shield 25 and lower firewall floor surface 35. When the foot pedals 18A and 18B are moved to the inactive position "I" (FIG. 4), the pedals 18A and 18B are positioned in the gap 36 in front of plate 26 of pedal shield 25. In general, the steering wheel 12 and pedals 18A and 18B may be shifted to the inactive position "I" when motor vehicle 1 is parked or when motor vehicle 1 is in the autonomous mode. Thus, when motor vehicle 1 is in the autonomous mode, the steering wheel 12 and pedals 18A and 18B may be shifted to the inactive position "I," and the pedal shield 25 blocks access to the pedals 18A and 18B such that a driver or other person in the passenger compartment does not inadvertently actuate the pedals 18A and 18B. Also, when pedals 18A and 18B are in the inactive position, the pedals 18 are not disposed in the driver's footwell, thereby providing additional space for an individual in the driver's seating area 3.

Figure 4A:
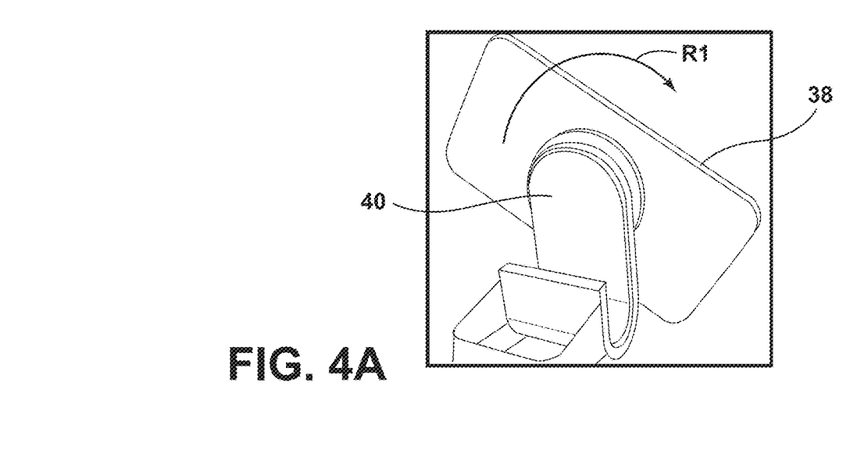
FIG. 4A is a partially fragmentary perspective view of the display screen of FIG. 4.

Referring again to FIG. 1, motor vehicle 1 may further include an electronic display screen 38 that is positioned adjacent a central portion 41 of dashboard 30. The electronic display screen 38 may be supported on a screen support 40 (see also FIGS. 4 and 4A) whereby the electronic display screen 38 can be rotated about a generally horizontal axis as shown by the arrow "R1" (FIG. 4A). As discussed in more detail below, when the steering wheel 12 is in the inactive (e.g., center) position "I" (FIG. 4), the steering wheel 12 may be positioned between electronic display screen 38 and dashboard 30, such that the steering wheel 12 is substantially hidden from the view of individuals seated in the driver and passenger seating areas 3 and 5, respectively. Display screen 38 may be rotated from a portrait orientation (FIG. 1) to a landscape orientation 38A. In general, the portrait orientation may be utilized when the steering wheel 12 is in the use position to display maps, vehicle operating information, and the like. When the steering wheel 12 is positioned behind the screen 38, screen 38 may be rotated to the landscape orientation 38A, and screen 38 may be utilized to display movies, TV shows, web pages, or other entertainment material that is not necessarily related to an operating state of motor vehicle 1.

Referring again to FIG. 2, steering wheel 12 includes a user-graspable portion, such as rim 43. Rim 43 may be movably interconnected to the steering column 14 by a steering pivot arm such as link 44. Link 44 is pivotably connected to steering column 14 at first pivot 45, and link 44 is pivotably connected to rim 43 at a second pivot 46. One or both pivots 45 and 46 may include a releasable locking mechanism 66 (FIG. 5) to selectively permit and prevent pivoting. As discussed in more detail below, the rim 43 can be shifted forward by rotating link 44, and the steering wheel 12 can then be shifted to the inactive position between electronic display screen 38 and dashboard 30.

Figures 2, 3:
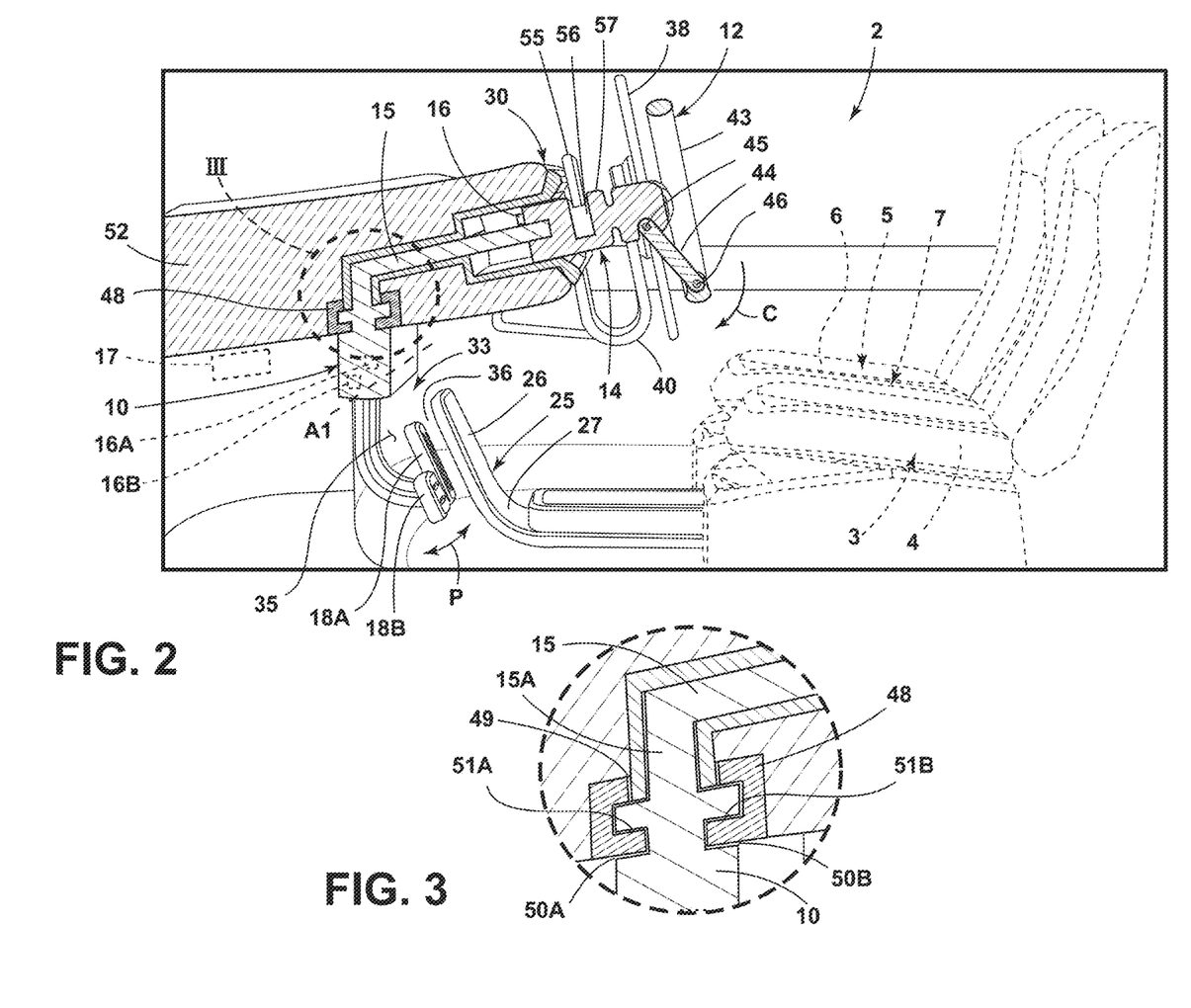
FIG. 2 is a partially fragmentary cross-sectional view of the motor vehicle of FIG. 1.
FIG. 3 is a fragmentary, enlarged portion of FIG. 2.

With reference to FIG. 3, the movable support structure 10 may be movably interconnected with a guide structure, such as a channel 48 to provide guided lateral movement of support structure 10. As shown in schematic form in FIG. 3, an end portion 15A of connecting structure 15 of movable support structure 10 may extend through an elongated horizontal slot 49 of channel 48 to thereby permit lateral movement of connecting structure 15 and steering wheel 12 along the channel 48. Lateral movement of support structure 10 results in simultaneous lateral movement of steering wheel 10 and pedals 18A, 18B. The channel 48 may be substantially C-shaped, and may include elongated linear flanges 51A and 51B that are movably received in elongated channels or slots 50A and 50B of movable support structure 10 to thereby provide a slidable connection between connecting structure 15 and channel 48. Suitable low friction bearings (not shown) may be utilized to provide a low friction movable interconnection between support structure 10 and channel 48. Channel 48 may be rigidly secured to a vehicle structure, such as dash structure 52. It will be understood that the present disclosure is not limited to any particular guide structure or arrangement, and the movable support structure 10 may be movably interconnected to vehicle structure 52 utilizing virtually any suitable guide structure. Also, the channel 48 or other guide structure does not necessarily need to be linear, and could, optionally, include a curve such that steering wheel 12 and/or pedals 18A and 18B move laterally along a curved path rather than a linear path.

Figure 1:
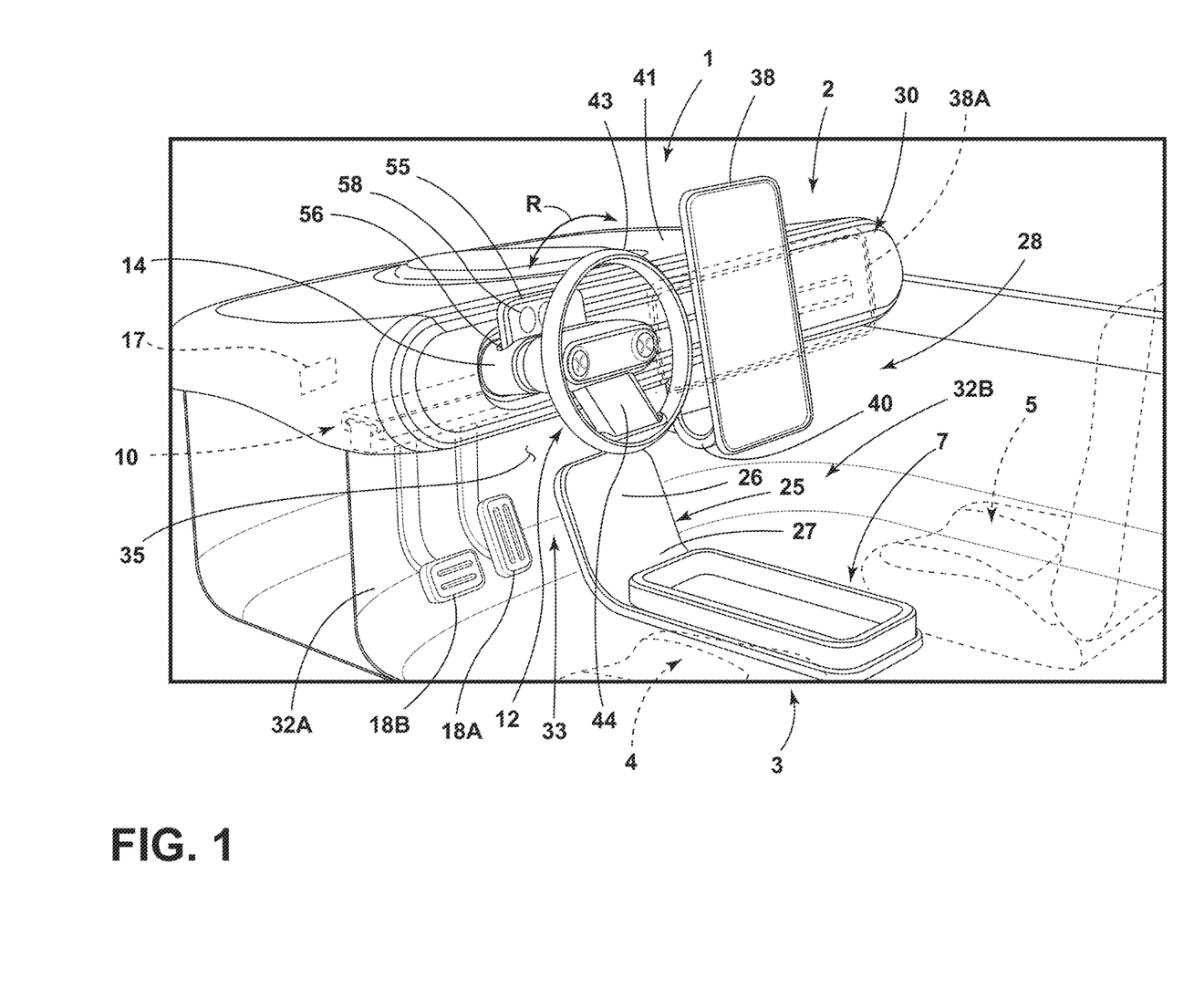
FIG. 1 is a partially fragmentary perspective view of a portion of a motor vehicle according to one aspect of the present disclosure.
Figure 6:
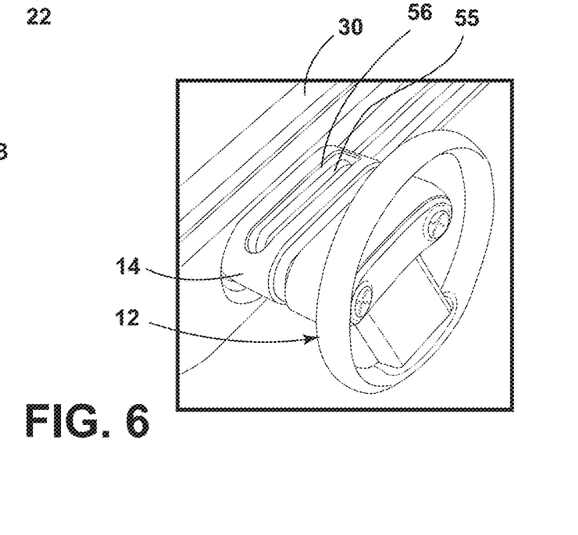
FIG. 6 is a partially fragmentary perspective view of the steering wheel of FIG. 4 showing the cluster display in a retracted position.

Referring again to FIGS. 1 and 2, motor vehicle 1 may also include an electronic display screen, such as cluster display 55 that is movably disposed in a slot 56 in upper surface 57 of steering column 14. Cluster display 55 may be configured to display various images 58 providing an operator of motor vehicle 1 with vehicle speed and/or other information concerning operation of motor vehicle 1. Cluster display 55 may be positioned in an upper position as shown in FIGS. 1 and 2 when steering wheel 12 is in a driving use position, and the cluster display 55 may be retracted downwardly into slot 56 prior to moving steering wheel 12 to the center inactive position. In particular, the cluster display 55 may be shifted to a lowered position as shown in FIG. 6 whereby at least a substantial portion of cluster display 55 is not visible to a vehicle operator.

Figure 5:
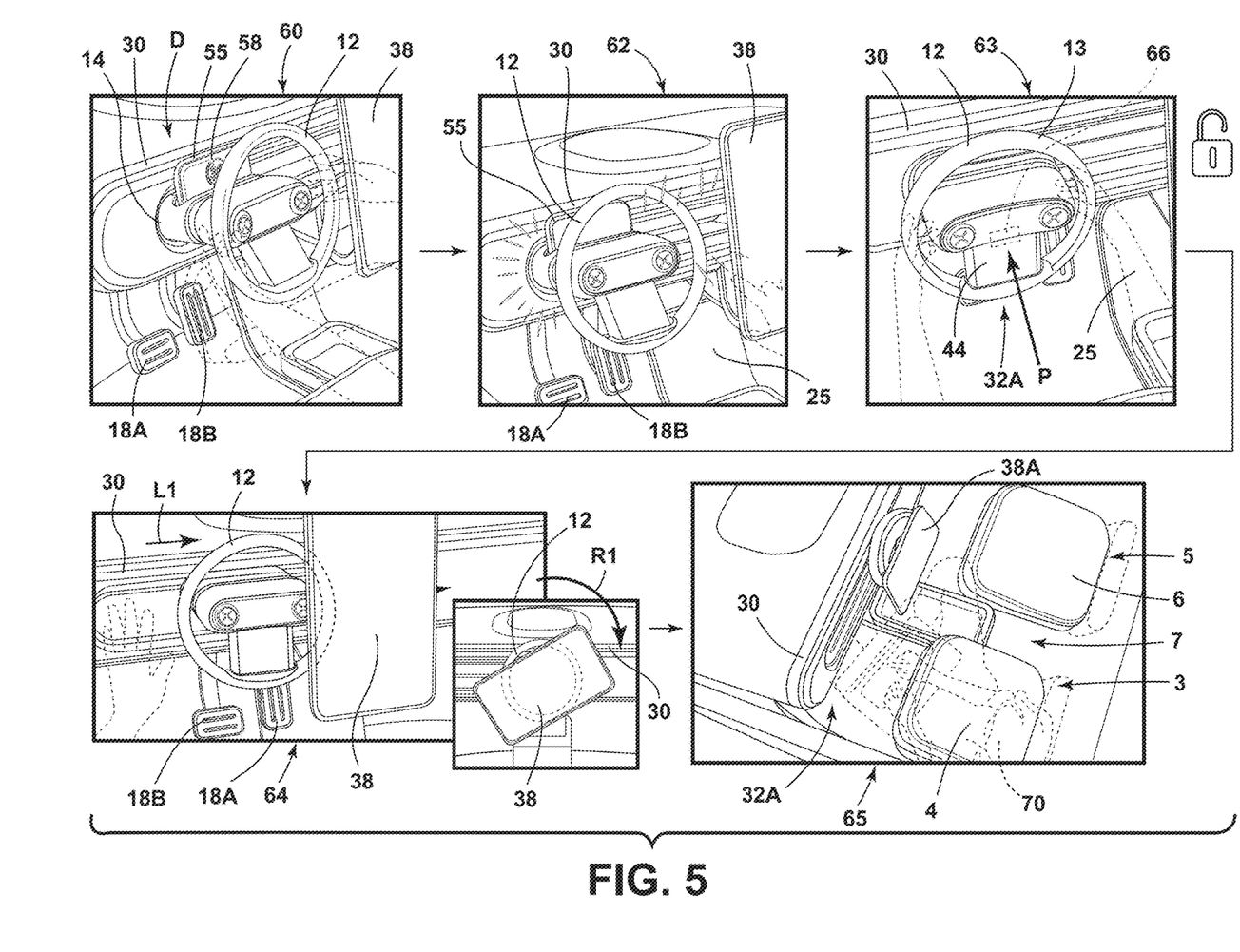
FIG. 5 is a schematic flowchart showing operation of the steering wheel, foot pedals, and display screen of the motor vehicle of FIG. 1.

With further reference to FIG. 5, the steering wheel 12 and pedals 18A and 18B may initially be in an active driving configuration "D," with cluster display 55 extending upwardly from steering column 14. Electronic display screen 38 may be in a portrait orientation. In a second configuration 62, an automatic vehicle mode (AV mode) may be detected, and motor vehicle 1 may take over driving and communicates options to the driver and/or passengers. As noted above, the steering wheel 12 and pedals 18 may also be shifted to an inactive position/configuration when motor vehicle 1 is parked.

As shown at 63, when motor vehicle 1 is in the AV mode, the steering wheel 12 is unlocked, thereby permitting movement of rim 13 as link 44 pivots. In particular, a powered lock mechanism 66 may selectively lock rotation of link 44 at first and/or second pivots 45 and 46, such that a user can apply a force "P" to the rim 13 thereby moving the rim 13 forward.

As shown at 64, the steering wheel 12 and pedals 18A and 18B may then be shifted laterally as shown by the arrow "L1." In particular, electric motor 20 may be actuated to provide for powered movement of steering wheel 12 and pedals 18A and 18B towards the center, inactive position. Alternatively, motor vehicle 1 may not include an electric motor or other powered actuator, and the steering wheel 12 and pedals 18A and 18B may be shifted laterally by a user applying force to the steering wheel 12. The electronic display screen 38 may also be rotated from a portrait orientation to a landscape orientation, with the steering wheel 12 disposed between display screen 38 and dashboard 30.

As shown at 65, a user 70 in the driver's seating area 3 may then perform other activities. Because the pedals 18A and 18B are disposed behind pedal shield 25, the driver's side footwell 32A is clear of the pedals 18A and 18B, thereby providing increased space for driver 70.

Figure 6A:
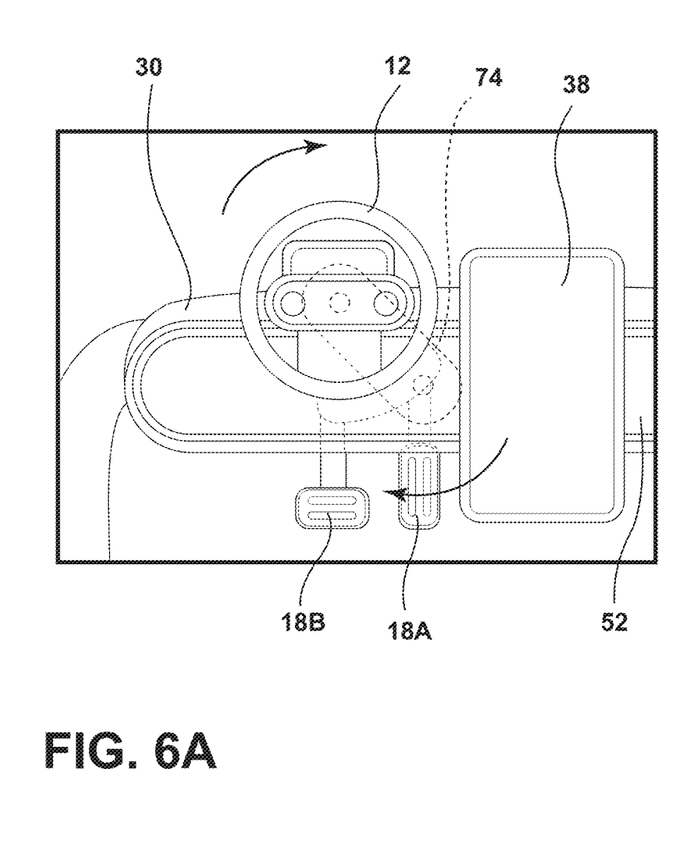
FIG. 6A is a partially schematic perspective view showing a movable steering wheel and pedal arrangement according to another aspect of the present disclosure.
Figure 6B:
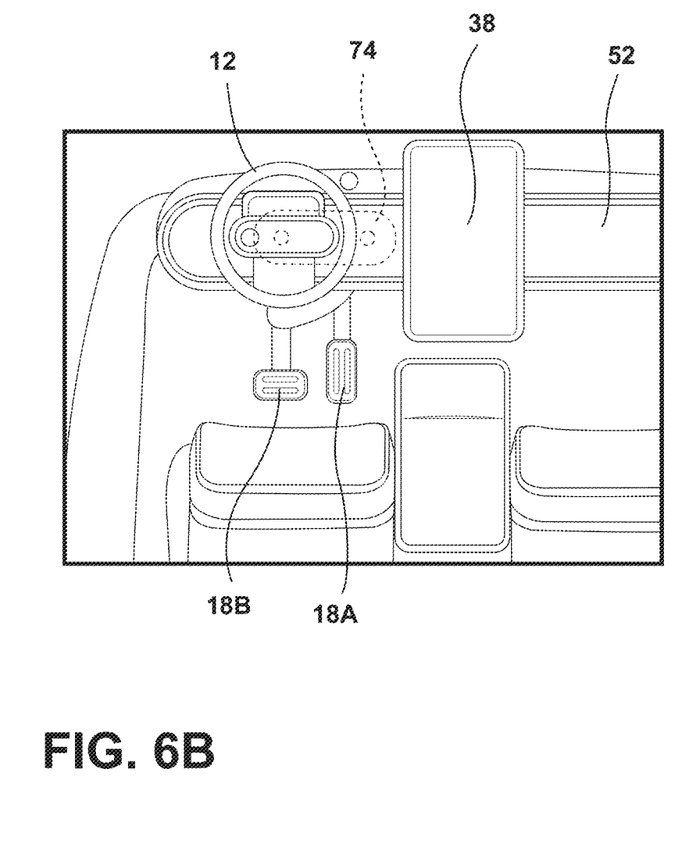
FIG. 6B is a partially schematic perspective view of the movable steering wheel and pedal arrangement of FIG. 6A.

With further reference to FIGS. 6A and 6B, steering wheel 12 and pedals 18A and 18B may be movably mounted to a vehicle structure 52 by a rotational arm 74 that provides for movement of steering wheel 12 and pedals 18 between a driving position "D" and an inactive position "I" (FIG. 4). Rotational arm 74 may be operably connected to a powered actuator (not shown) to provide for rotation of the rotational arm 74.

Figure 7:
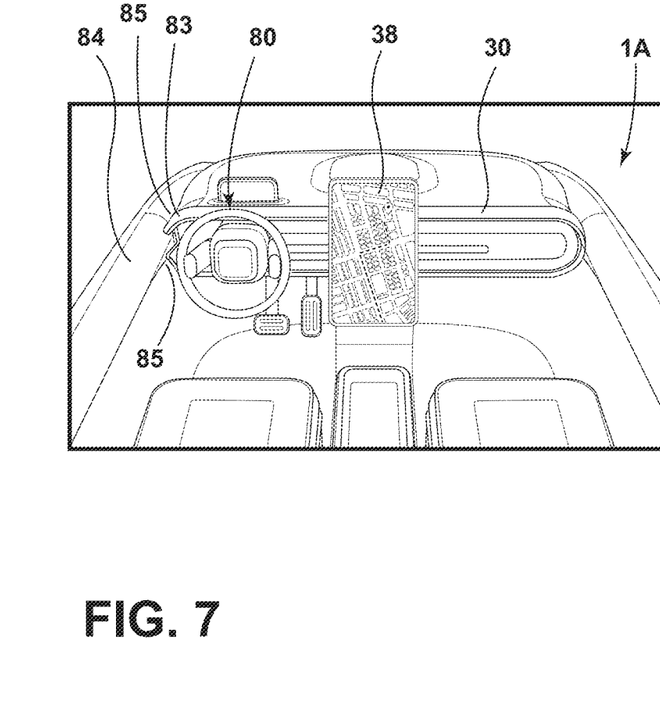
FIG. 7 is a partially fragmentary perspective view of an interior of a motor vehicle according to another aspect of the present disclosure showing the steering wheel and foot pedal in a use position.
Figure 8:
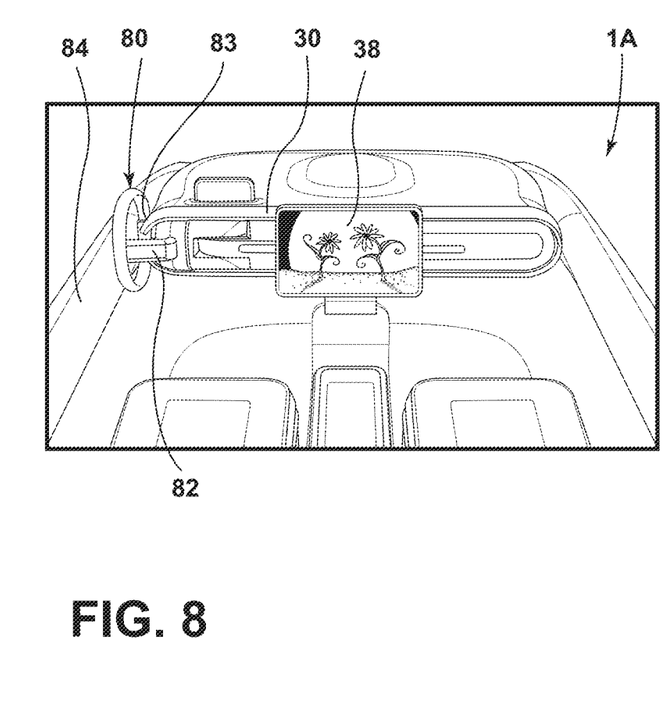
FIG. 8 is a partially fragmentary perspective view of an interior of a motor vehicle according to another aspect of the present disclosure showing a steering wheel and foot pedals in stowed positions.
Figure 9:
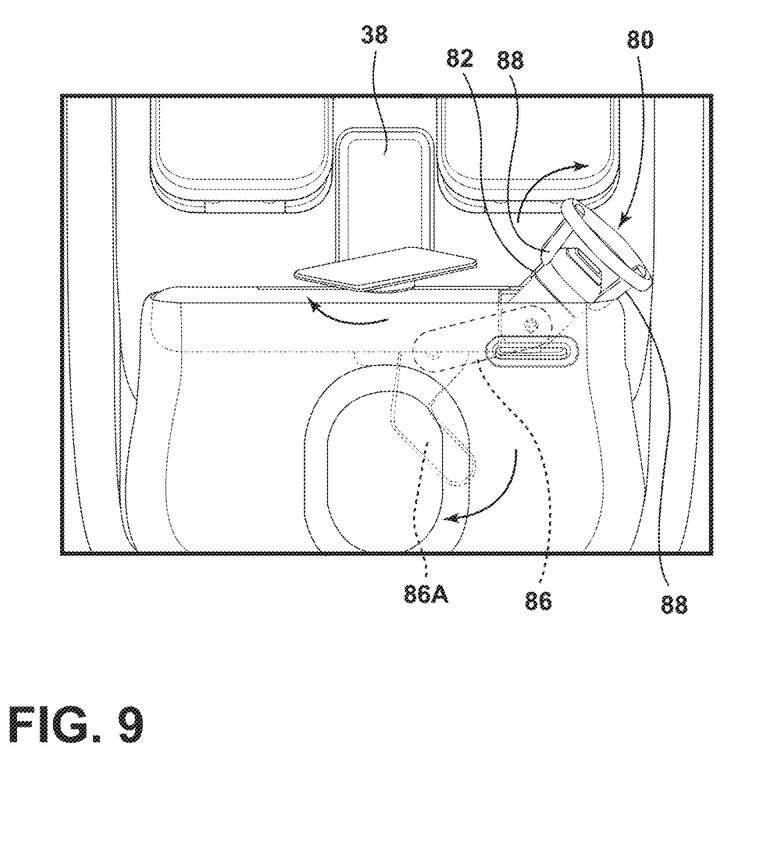
FIG. 9 is a partially fragmentary plan view of the motor vehicle of FIG. 7.
Figure 10:
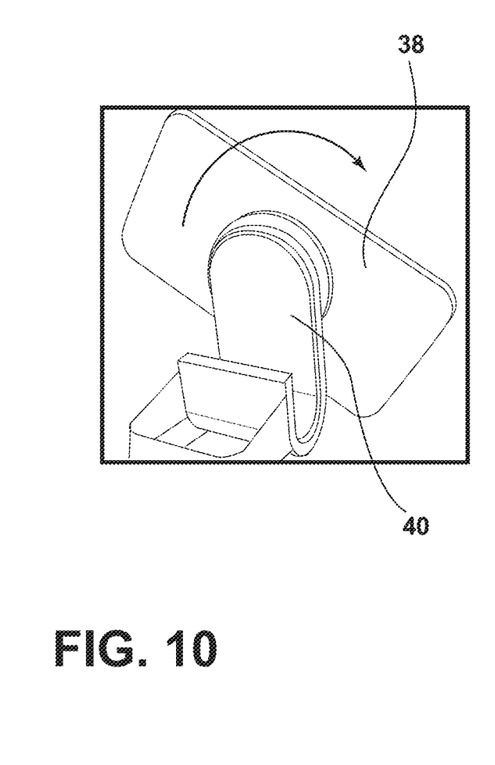
FIG. 10 is an isometric view showing movement of the display screen of the motor vehicle of FIG. 7.
Figure 11:
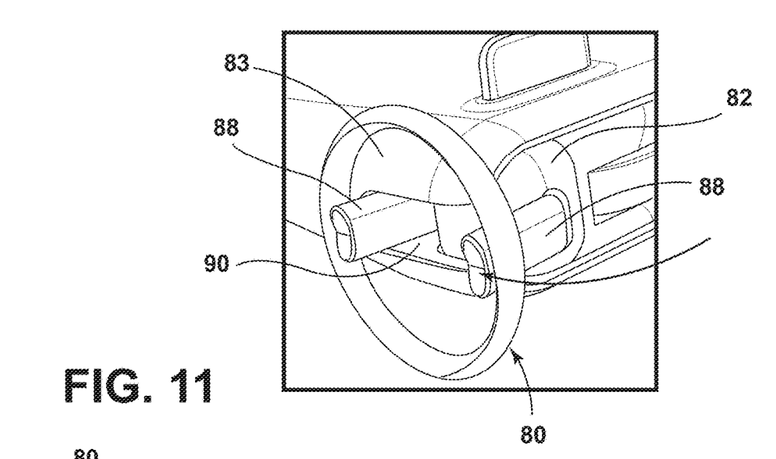
FIG. 11 is a partially fragmentary isometric view showing the steering wheel of FIG. 7 when in the stowed position of FIG. 8.
Figure 12:
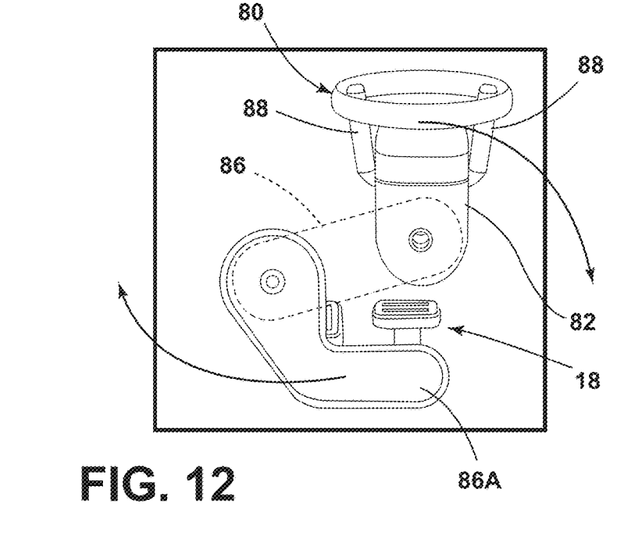
FIG. 12 is a schematic plan view showing movement of the steering wheel and foot pedals of the motor vehicle of FIG. 7.
Figure 13:
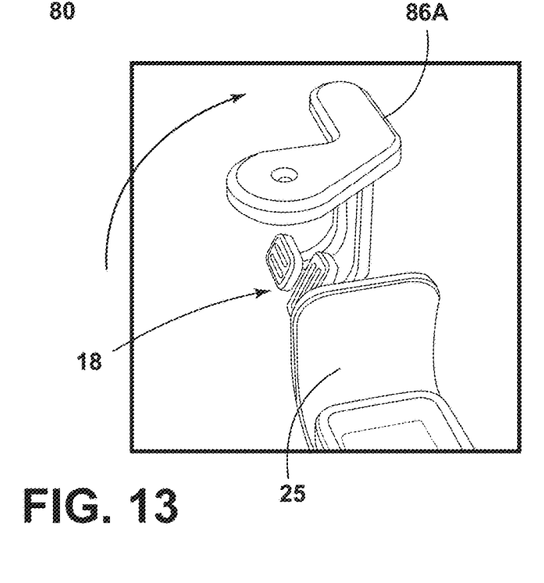
FIG. 13 is a partially fragmentary isometric view showing movement of the foot pedals to a stowed position.

With further reference to FIGS. 7 and 8, a motor vehicle 1A according to another aspect of the present disclosure may include a steering wheel 80 and steering column 82 that moves horizontally from a driving position (FIG. 7) to an inactive or stowed position (FIG. 8). An end 83 of dashboard 30 is spaced-apart from driver's side door 84 to form a gap 85. When the steering wheel 80 is in the inactive or stowed position of FIG. 8, the steering wheel 80 is at least partially disposed in the gap 85.

With further reference to FIGS. 9-13, the steering wheel 80 and pedals 18A and 18B may be movably interconnected to pivot arms 86 and 86A whereby rotation of pivot arms 86 and 86A simultaneously moves the steering wheel 80 and pedals 18A and 18B. Steering column 82 may include extensions 88 that are at least partially received in a slot 90 (FIG. 11) in end 83 of dashboard 30 when steering wheel 80 is in the stowed or inactive configuration or position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
   a passenger compartment including a driver's seating area, a front passenger seating area, and a center area between the driver's seating area and the front passenger seating area, the passenger compartment further including a lower space having driver and passenger footwells in front of the driver and passenger seating areas, respectively, the lower space further including a lower center space between the driver and passenger footwells;
   a movable support structure;
   a steering wheel rotatably connected to the movable support structure;

a foot pedal movably connected to the movable support structure;
a pedal shield disposed in the lower space;
a powered actuator operably connected to the movable support structure, wherein actuation of the powered actuator moves the movable support structure, thereby moving the steering wheel and the foot pedal between an active driving position in which the steering wheel and the foot pedal are aligned in a fore-aft direction with the driver's seating area of the passenger compartment, and an inactive position in which the steering wheel and the foot pedal are both shifted laterally relative to the active driving position;
wherein the foot pedal is positioned in the driver footwell when the steering wheel the foot pedal are in the active driving position, and wherein the foot pedal is positioned in the lower center space when the steering wheel and the foot pedal are in the inactive position;
and wherein the foot pedal is positioned forward of the pedal shield when the foot pedal is in the inactive position.

2. The motor vehicle of claim 1, including:
a control system having an autonomous mode and a driver-controlled mode, whereby a vehicle operator does not need to access the steering wheel or the foot pedal to control the motor vehicle when the control system is in the autonomous mode.

3. The motor vehicle of claim 1, wherein:
the powered actuator is configured to simultaneously shift the steering wheel and the foot pedal from the active driving position to the inactive position upon actuation of the powered actuator.

4. The motor vehicle of claim 1, wherein:
the powered actuator is configured to simultaneously shift the steering wheel and the foot pedal from the inactive position to the active driving position upon actuation of the powered actuator.

5. The motor vehicle of claim 1, including:
a horizontally-extending guide structure;
and wherein the movable support structure is movably supported by the horizontally-extending guide structure for lateral movement.

6. The motor vehicle of claim 1, including:
a pivot arm movably connecting the movable support structure to a vehicle structure such that actuation of the powered actuator causes the pivot arm to pivot, thereby moving the movable support structure between the active driving position and the inactive position.

7. The motor vehicle of claim 1, wherein:
the steering wheel is supported by a steering column having an opening in an upper surface thereof; and including:
a cluster display movably mounted to the steering column for movement between a use position in which the cluster display projects upwardly from the elongated opening whereby images on a first portion of the cluster display are visible to an operator in the driver's seating area, and a stowed position in which the cluster display is lowered into the opening such that the first portion of the cluster display is not visible to an operator in the driver's seating area.

8. The motor vehicle of claim 7, wherein:
the steering wheel includes an outer portion having at least two gripping portions that are configured to be simultaneously grasped by an operator of the motor vehicle, and a steering pivot arm pivotably connected to the outer portion of the steering wheel and to the steering column whereby the outer portion of the steering wheel can be moved relative to the steering column between a use position and a stowed position that is forward of the use position upon pivoting of the steering pivot arm.

9. A motor vehicle comprising:
a passenger compartment including a lower space, a driver's seating area, a front passenger seating area, and a center area between the driver's seating area and the front passenger seating area;
a movable support structure;
a steering wheel rotatably connected to the movable support structure;
a foot pedal movably connected to the movable support structure;
a powered actuator operably connected to the movable support structure, wherein actuation of the powered actuator moves the movable support structure, thereby moving the steering wheel and the foot pedal between an active driving position in which the steering wheel and the foot pedal are aligned in a fore-aft direction with the driver's seating area of the passenger compartment, and an inactive position in which the steering wheel and the foot pedal are both shifted laterally relative to the active driving position;
a horizontally-extending dashboard structure above the lower space of the passenger compartment, the horizontally-extending dashboard structure having at least a driver's side portion in front of the driver's seating area and a center portion that is forward of the center area; and
an electronic display screen disposed adjacent the center portion of the horizontally-extending dashboard structure, and wherein the steering wheel is positionable in a gap between the electronic display screen and the center portion of the horizontally-extending dashboard structure when the steering wheel is in the inactive position.

10. The motor vehicle of claim 9, wherein:
the electronic display screen has an oblong shape defining a first dimension along a length of the oblong shape that is greater than a dimension transverse to the length, wherein the electronic display screen is pivotable between a portrait orientation in which the first dimension is disposed in a substantially vertical plane, and a landscape orientation in which the first dimension is disposed in a substantially horizontal plane.

11. A motor vehicle comprising:
a passenger compartment including a driver's seating area, a driver's footwell in front of the driver's seating area, and a central space laterally adjacent the driver's footwell;
a pedal shield disposed in the central space; and
a foot pedal that is laterally movable between a use position in the driver's footwell and an inactive position in which the pedal shield substantially blocks operator access to the foot pedal when an operator is seated in the driver's seating area.

12. The motor vehicle of claim 11, including:
a powered actuator configured to shift the foot pedal laterally between the use position and the inactive position.

13. The motor vehicle of claim 12, wherein:
the motor vehicle includes a dashboard; and
the pedal shield is positioned below a central portion of the dashboard and includes an angled surface facing rearwardly and upwardly.

14. The motor vehicle of claim 13, wherein:
the motor vehicle includes a steering wheel that is supported by a movable support structure, and wherein the foot pedal is supported by the movable support structure, and wherein actuation of the powered actuator moves the laterally-movable support structure to laterally move the steering wheel and the foot pedal.

15. The motor vehicle of claim 11, wherein:
the motor vehicle includes a dashboard having an end that is spaced-apart from an inner surface of a driver's side door to define a gap; and
the motor vehicle further including a steering wheel that is movably mounted to a vehicle structure whereby the steering wheel is configured to move laterally from a use position in front of the driver's seating area to a stowed position adjacent the driver's side door, and wherein the steering wheel is configured to pivot about an upright axis and move into a stowed position at least partially in the gap.

16. A motor vehicle comprising:
a passenger compartment including a driver's seating area and a foot pedal that is positionable in a driver's footwell in front of the driver's seating area;
a dashboard having an end that is spaced-apart from an inner surface of a driver's side door to define a gap; and
a steering wheel that is movably mounted to a vehicle structure whereby the steering wheel moves laterally from a use position in front of the driver's seating area towards a stowed position adjacent the driver's side door, and pivots about an upright axis and moves into a stowed position at least partially in the gap.

17. The motor vehicle of claim 16, wherein:
the steering wheel includes a rim and a connecting structure that extends forward from the rim when the steering wheel is in the use position; and
the end of the dashboard includes a slot, and wherein at least a portion of the connecting structure of the steering wheel is disposed in the slot when the steering wheel is in the stowed position.

18. The motor vehicle of claim 16, wherein:
the foot pedal is connected to a link that pivots about an upright axis such that the foot pedal moves between a use position in the driver's footwell to a stowed position outside of the driver's footwell upon pivoting of the link.

* * * * *